United States Patent Office 3,070,993
Patented Jan. 1, 1963

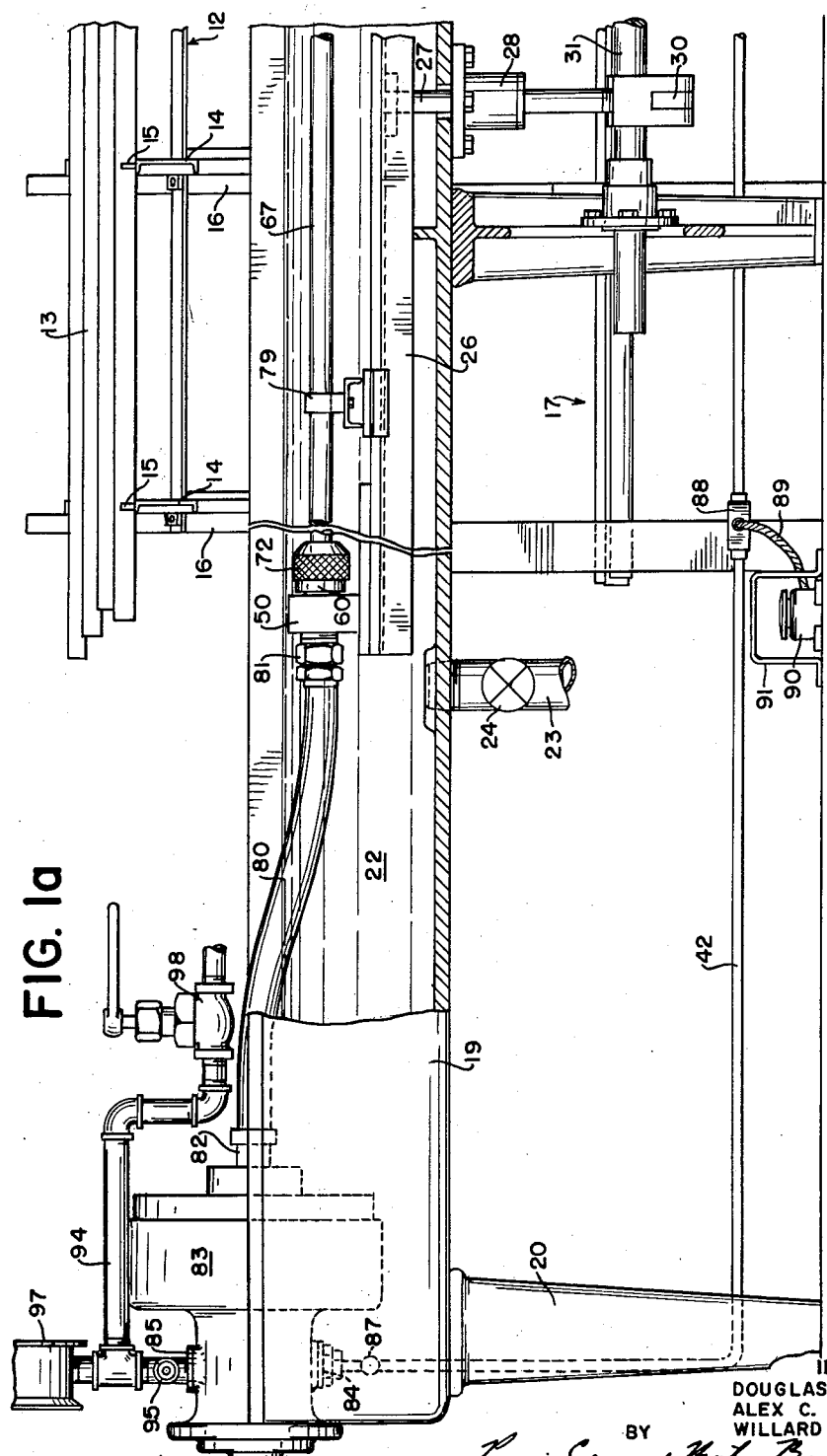

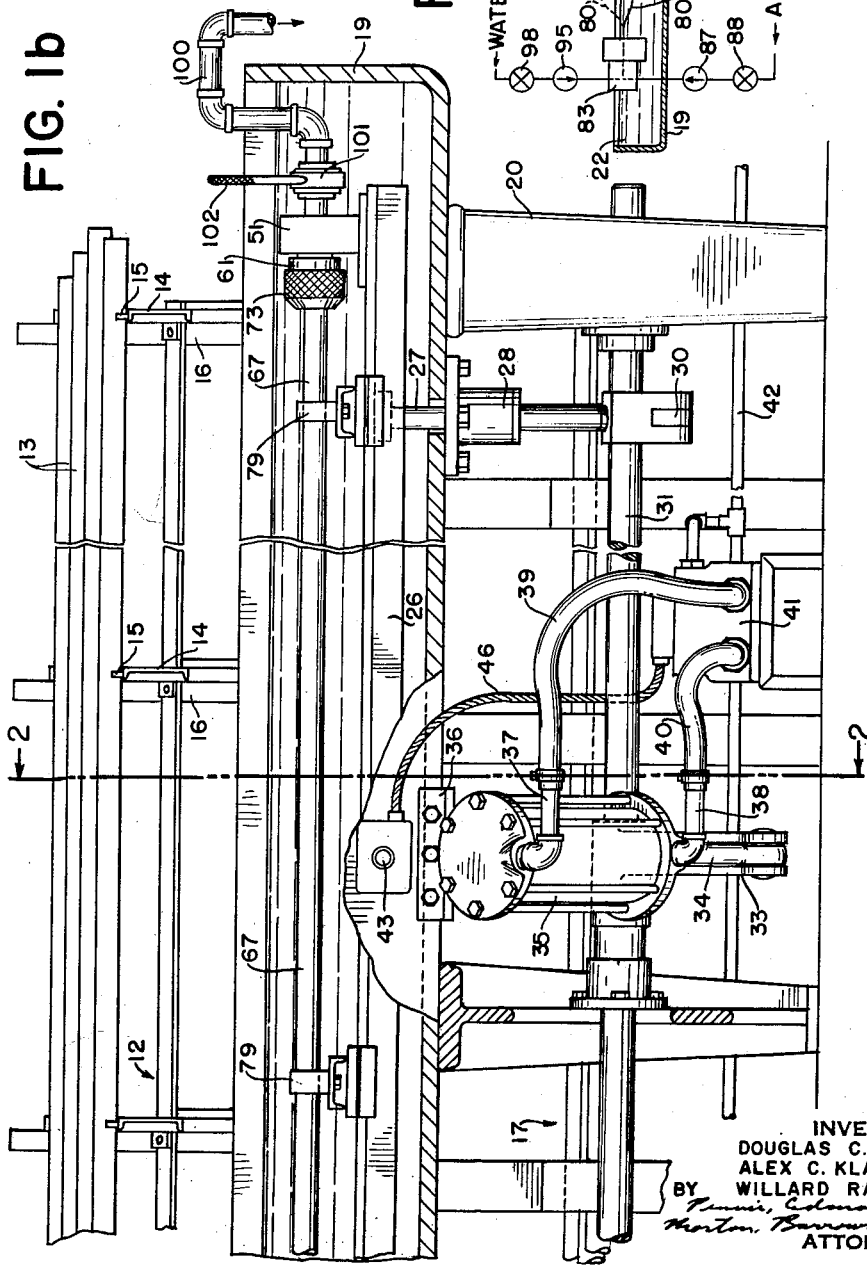

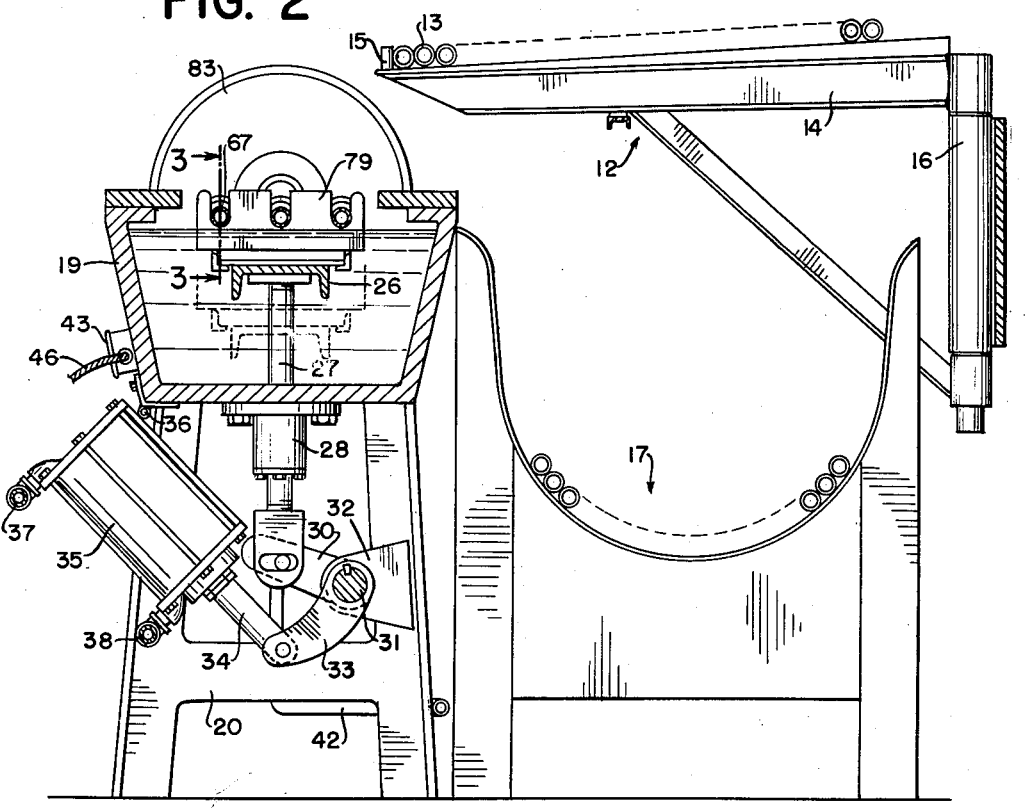

3,070,993
TUBE LEAKAGE TESTING APPARATUS
Douglas C. Rowell, Alex C. Klaczynski, and Willard Ray Flinn, Kenosha, Wis., assignors to Anaconda American Brass Company, a corporation of Connecticut
Filed Feb. 16, 1959, Ser. No. 793,581
4 Claims. (Cl. 73—49.5)

This invention relates to the testing of pipes and tubes for leaks and, more particularly, to a method and apparatus for detecting leaks in a tube by first pressurizing the tube pneumatically under water and then pressurizing it hydrostatically in air at a considerably higher pressure.

Tubing designed to convey fluids is generally subjected to careful inspection after it is fabricated to insure that no cracks or holes are present in its wall structure which might later be the cause of leakage. This inspection is particularly exacting for boiler tubes, condenser tubes, and the like which in service are likely to contain pressurized fluids, because even the smallest cracks can enlarge under operating conditions to cause the tube to leak or even burst. Tubing intended for pressurized service is usually tested by being subjected to the same elevated hydrostatic pressures at which it is intended to operate, to determine whether minute cracks or holes exist in its walls.

It has often been found, however, that the smallest of these defects are not disclosed by standard hydrostatic pressure tests and, in fact, may go un-noticed for a considerable length of time after the tubing is installed and in use, because even at high pressure water does not always emerge visibly through very small cracks during the short test period. Hence even inspected tubing may contain undetected defects through which leakage may occur and which may enlarge, and which may even eventually cause the tube to burst during operation.

One of the primary objects of the present invention, therefore, is to provide a method and apparatus for testing tubing in such a manner that even these minute defects in the wall structure may be easily exposed. Because compressed air passes through the very small cracks and holes more readily than will a liquid, and is quickly visible as bubbles if the object under test is immersed in a liquid, the present method provides that the tubing be pressurized with air and submerged in water in addition to being hydrostatically pressurized. Thus, the former step readily and clearly discloses even the smallest leaks which might exist in the tube, and the latter test indicates whether the tube is sufficiently sound to withstand operating pressures without opening leaks which do not exist at the relatively low pressure of the pneumatic test.

The apparatus contemplated by the invention provides means for pneumatically pressurizing the tube while it is submerged in water, and then hydrostatically pressurizing it in air. The apparatus comprises an open trough for containing a liquid, in which are located movable supporting means. A pair of spaced tube-receiving fittings are mounted on the supporting means and are adapted to receive opposite ends of at least one tube in sealed engagement therewith. One of the fittings partially defines a passage adapted to communicate with the interior of the tube received thereby. Separate hydrostatic and pneumatic pressure sources are provided, and valve means permit optionally closing the passage and selectively opening it to one of said separate pneumatic and hydrostatic pressure sources and the atmosphere. Lifting means are associated with the movable supporting means for selectively submerging and emerging the tube supported thereby relative to the liquid in the trough. Thus, the apparatus permits the tube being tested to be subjected by manipulation of the valve means to pneumatic pressure when submerged and hydrostatic pressure when emerged.

A preferred embodiment of the new method and apparatus is described hereinbelow with reference to the accompanying drawings, wherein FIGS. 1a and 1b together show an elevation partly broken away and in section of a preferred form of the new tube leakage testing apparatus;

FIG. 2 is a sectional view taken along the line 2—2 of FIG. 1b;

FIG. 3 is an enlarged sectional view partly broken away showing the tube-receiving fittings with a tube operatively mounted therein; and FIG. 4 is a diagrammatic view schematically illustrating the sequence of operation contemplated by the method of the invention.

Referring first to FIGS. 1a, 1b and 2, a rack 12 is constructed to hold a number of tubes 13 which are to be tested for leaks. Several extended arms 14 sloping slightly downwardly toward their outer ends are included in the rack 12 and are each equipped with stops 15 which prevent tubes on the rack from rolling off the ends of the arms. The arms 14 are pivotally mounted on posts 16 to permit them to be swung aside when not in use. Beneath the rack 12, a cradle 17 is provided into which the tubes may be deposited after they have been tested. Positioned adjacent and parallel to the rack 12 and cradle 17 is an extended trough 19 mounted on a base 20. The trough 19 is adapted to be filled with a quantity of water 22 from any convenient source and to be drained through an outlet 23 which is provided with a valve 24.

Within the trough 19 a supporting member 26 is formed of an inverted channel which is secured to vertically movable rods 27 extending downwardly through the floor of the trough. Packing rings 28 surround each rod to prevent escape of the water in the trough 19. Lifting means are included in the apparatus to permit the rods 27 to be moved upwardly to raise the supporting member 26 from the position shown in FIG. 2 in dotted lines to that shown in solid lines. Such means comprise crank arms 30 on which the lower ends of the rods 27 slidably engage. The crank arms are each affixed to a common rotatable crank shaft 31, which extends the length of the apparatus beneath the trough and is secured to the base 20 by several brackets 32. An arm 33 is rigidly keyed to the shaft 31 at one point along its length and is in pivotal engagement at its outer end with the end of a piston rod 34 of a double-acting air cylinder 35. By means of a hinge attachment 36, the air cylinder 35 is pivotally suspended from the forward lower edge of trough 19.

Ports 37 and 38 at each end of the double-acting cylinder 35 are connected by flexible conduits 39 and 40 respectively to a time-valve 41. To actuate the air cylinder 35, compressed air is admitted from a pressurized air line 42 by pressing a switch button 43 which, in turn, activates a solenoid and opens the timer-valve 41. After a predetermined period the time-valve admits air to the other end of the air cylinder and the cylinder operates in the opposite direction. Thus, the supporting member 26 is lowered and, after a certain delay, is raised automatically following a single pressing of the switch button 43.

Two opposed tube-receiving fittings 50 and 51 are affixed to the supporting member 26 within the trough 19, as shown in detail in FIG. 3. The fittings 50 and 51 are provided with manifold passages 53 and 54 respectively extending laterally therewithin. Tapered pipe seats 55 and 56 are formed in the outer faces of each of the fittings 50 and 51 respectively, and communicate with the corresponding manifold passages 53 and 54. On each of the opposed inner faces of the fittings 50 and 51 are three more opposed pairs of tapered pipe seats 58 and 59 each receiving an opposed pair of threaded socket members 60 and 61. Only one pair of the seats 58 and 59 and their respective socket members 60 and 61 are shown in FIG. 3, but the other two opposed pairs are identical. In each of the socket members 60 and 61 longitudinal bores 62 and 63 respectively are formed which extend completely therethrough to communicate with the corresponding manifold passages 53 and 54. The outer end of each of the bores 62 and 63 opens into sockets 65 and 66 respectively which are adapted to receive opposite ends of a tube 67, so that the manifold passages 55 and 56 each communicate with the interior of the tube.

Annular resilient rubber bushings 69 and 70 fit within and around the outer ends of the socket members 60 and 61 and are held in place by internally threaded collars 72 and 73. Passages 75 and 76 are formed in the socket members 60 and 61 to cause the fluid pressure within the bores 62 and 63 to act upon the bushings 69 and 70 so that they are forced radially inwardly against the outside surface of the end of the tube. In this manner a self-sealing action is achieved during the test.

In order to permit the tube 67 under test to be operatively positioned as shown in FIG. 3, one socket 65 is provided with a substantial amount of clearance between its inner end and the end of the tube received thereby. This clearance is at least equal to the distance that the opposite end of the tube 67 is inserted into the other socket 66. Hence, when the tube is mounted, one end is first inserted as far as possible into the first socket 65 so that the opposite end may clear the collar 73. The tube is then brought into alignment with and inserted into the socket 66, to the position shown in FIG. 3.

It must be remembered that the pairs of manifold fittings 50 and 51 are adapted to receive the ends of three tubes at once. Thus, three socket members are threaded into each fitting. This, of course, is simply to permit testing three tubes at once. Tube rests 79, which are placed along the supporting member 26 at suitable points intermediate the fittings 50 and 51 to support the tubes during testing, are therefore adapted to receive three tubes as seen in FIG. 3. One or both of the fittings 50 and 51, and the tube rests 79, may be slidably mounted on the supporting member 26 to accommodate tubes of various lengths.

Turning now to FIG. 1a, it will be seen that a flexible conduit 80 is attached by means of an end fitting 81 engaged in the pipe seat 55. The other end of the flexible conduit 80 is connected to the outlet 82 of a head member 83 which is permanently mounted at the end of the trough 19. The head member 83 is provided with a pair of inlet connections 84 and 85 which come together within the member to communicate with the outlet 82. The previously mentioned compressed air line 42 is connected to the inlet connection 84, with a check valve 87 located in the air line adjacent the inlet connection. The checks valve 87 permits pressurized air to enter the head member 83, but prevents flow in the opposite direction. Further along the compressed air line 42, about in line with the manifold fitting 50, a normally closed solenoid operated valve 88 is located. The valve solenoid is electrically connected by a conductor 89 to a foot switch 90 mounted on the floor. A guard 91 prevents inadvertent actuation of the foot switch 90. Thus it is possible to admit compressed air through the head member 83 into the conduit 80 and thence into the tubes supported in the trough 19 simply by pressing down on the foot switch 90.

A water pipe 94 is attached to the other inlet connection 85 of the head member 83. The water pipe 94 leads to a pump or other source of pressurized water. A second check valve 95 is positioned in the water pipe 94 adjacent the inlet connection 85 to allow water in the pipe to flow only forwardly into the head member 83. To indicate the water pressure in the pipe 94 and head member 83, a conventional pressure gauge 97 is attached to the pipe as shown. A water inlet valve 98 is located in the pipe 94 to provide means for manually admitting or shutting off the supply of pressurized water to the head member 83. Preferably, the valve 98 is located above the trough 19 at about arm-level, within convenient reach of the operator of the foot switch 90, and both the foot switch 90 and the valve 98 are within easy reach by the operator of the tube-receiving manifold fitting 50.

At the other end of the trough 79 (FIG. 1b), an outlet pipe 100 is fitted into the pipe seat 56 in the fitting 51. The outlet pipe 100 is directed upwardly so that when the supporting member 26 is submerged the pipe extends over the rim of the trough. Its outer end, however, is turned downwardly as shown to permit water carried therethrough to be directed into any convenient drainage means. If desired, a flexible hose connector might be employed to connect the end of the outlet pipe 100 to a drain, provided it were long enough to enable the pipe to move vertically through the path of travel of the supporting member 26.

To selectively open and close the pipe 100 as desired, a valve 101 is included. The valve is operated by an actuator arm 102 extending upwardly, where it is manually accessible even when the supporting member 26 is submerged.

In operation of the above-described embodiment of the apparatus, three tubes 13 are removed manually (by two operators stationed at opposite ends of the apparatus) from the rack 12 behind the trough 19. If desired, all of the controls of the apparatus (i.e., the valves 88, 98 and 101, foot switch 90, and switch 43) can be located at one end of the apparatus so that only one of the two operators need attend to them. The supporting member 26 should be in its upward emerged position shown in the solid lines in FIG. 2 so that the tubes can be supported on the rests 79 intermediate their ends. The three tubes are inserted at one end as far as possible into the socket 65 associated with the fitting 50, and then are moved to the right to the position shown in FIG. 3 after the other end has been moved past the edge of the opposite collar 73 and into alignment with the tube-receiving openings of the socket members 61.

While the tubes are being positioned in this manner, the valves 88, 98 and 101 are closed. (Operation of the valves can best be visualized from the schematic arrangement shown in FIG. 4.) When the tubes are mounted in position, the foot switch 90 is actuated to admit air from the compressed air line 42 through the solenoid valve 88 and check valve 87 into the three tubes mounted on the supporting member 26. In FIG. 3, it can be seen that the air pressure within the three tubes causes the resilient bushings 69 and 70 to be squeezed tightly against the ends of the tubes to provide an effective fluid seal.

When the air pressure within the tubes attains approximately 100 p.s.i. (or any other desired pressure), the valve 88 is closed. The switch button 43 is then depressed to actuate the timer-valve 41 and air is admitted through the conduit 39 into the outer end of the air cylinder 34. The piston rod 33 is thereby moved outwardly and the supporting member 26 is lowered into the trough 19 to the position shown by the solid lines in FIGS. 1a and 1b. When the supporting member 26 has reached its lowermost position, the operators of the apparatus look for any sign of bubbles rising through the water 22 in the trough, which would indicate a leak in one or more of the tubes being tested. After a preset delay of approximately 15 seconds, the timer-valve 41 is automatically actuated to admit air through the conduit 40 to move the piston 33 inwardly in the air cylinder 34. The supporting member 26 is thus returned to the solid line position shown in FIG. 2.

In the event that no leaks have been formed during submergence of the tube in the water in this manner, the valve 101 is opened to release the pressurized air within the tubes. The valve 98 is then opened to admit water into the pipe 94 through the check valve 95 and into the three tubes under test. When the water begins to flow out through the outlet pipe 100, the valve 101 is closed and the water pressure in the tubes is increased to approximately 1000 p.s.i. (or whatever might be the desired test pressure of the tubes) as indicated on the gauge 97, whereupon the valve 98 is closed. For a brief period the tubes are hydrostatically pressurized in this manner while the operator examines them for escaping jets of water and until it is apparent that they can successfully withstand the chosen operating pressure. Then the valve 101 is opened to release the water from within them; and the foot switch 90 is operated to admit compressed air into the tubes to purge them of water. The solenoid valve 88 is then closed and the tubes are removed manually from the apparatus by reversing the previously described mounting procedure. In the event that the tubes have successfully passed the test they are dropped into the cradle 17, and another set of three tubes is inserted in the apparatus in their place. If any of the tubes have failed the test, they are set aside elsewhere than in the cradle 17, for suitable disposal.

We claim:

1. Tube leakage testing apparatus comprising an open trough for containing a liquid, vertically movable supporting means in said trough, a pair of spaced tube-receiving fittings mounted on said supporting means, said fittings being adapted to receive opposite ends of at least one tube in sealed engagement therewith, each of said fittings partially defining a passage adapted to communicate with the interior of the tube received thereby, separate pneumatic and hydrostatic pressure sources, first valve means for optionally closing the passage in one of said fittings and selectively opening it to one of said separate pneumatic and hydrostatic pressure sources, second valve means for optionally closing the passage in the other of said fittings and selectively opening it to the atmosphere, and lifting means associated with said movable supporting means for selectively submerging and emerging the tube supported thereby relative to the liquid in the trough, whereby the tube being tested may by manipulation of said valve means be subjected to pneumatic pressure when submerged and hydrostatic pressure when emerged.

2. Tube leakage testing apparatus comprising an open trough for containing a liquid, vertically movable supporting means in said trough, a pair of spaced tube-receiving fittings mounted on said supporting means, said fittings defining substantially coaxial opposed sockets adapted to receive opposite ends of at least one tube, one of said opposed sockets providing clearance between its inner end and the normally positioned end of the tube received thereby which is at least equal to the distance that the other end of the tube is normally inserted in the opposite socket, each of said sockets having a substantially separate annular resilient bushing around at least a portion of its inside surface for engaging the tube, means for admitting pressurized fluid against the outside surface of said bushing to provide a tight seal around the end of the tube received thereby, each of said fittings partially defining a passage adapted to communicate with the interior of the tube received thereby, separate pneumatic and hydrostatic pressure sources, first valve means for optionally closing the passage in one of said fittings and selectively opening it to one of said separate pneumatic and hydrostatic pressure source, second valve means for optionally closing the passage in the other of said fittings and selectively opening it to the atmosphere, and lifting means associated with said movable supporting means for selectively submerging and emerging the tube supported thereby relative to the liquid in the trough, whereby the tube being tested may by manipulation of said valve means be subjected to pneumatic pressure when submerged and hydrostatic pressure when emerged.

3. Tube leakage testing apparatus comprising an open trough for containing water, vertically movable supporting means in said trough, a pair of spaced tube-receiving fittings mounted on said supporting means, said fittings defining a plurality of pairs of opposed substantially coaxial sockets adapted to receive opposite ends of a corresponding number of tubes, one of said sockets in each pair providing clearance between its inner end and the normally positioned end of the tube received thereby which is at least equal to the distance that the other end of the tube is normally inserted in the opposite socket of the pair, each of said sockets having a substantially separate annular resilient bushing around at least a portion of its inside surface for engaging the tube, means for admitting pressurized fluid from the interior of said tubes against the outside surface of the respective bushings to provide a tight self-seal around the end of the tubes received thereby, each of said fittings defining a passage adapted to communicate with the interior of each of the tubes received by the sockets in that fitting, separate pneumatic and hydrostatic pressure sources, a flexible conduit connected to one of said fittings and communicating with said passage therewithin, first valve means for optionally closing said conduit and selectively opening it to one of separate pneumatic and hydrostatic pressure sources, said hydrostatic pressure being considerably greater than said pneumatic pressure, second valve means for optionally closing the passage in the other of said fittings and selectively opening it to the atmosphere, and lifting means for selectively submerging and emerging the removable supporting means and the tubes supported thereby relative to the water in the trough, whereby the tubes being tested may by manipulation of said valve means be subjected to pneumatic pressure when submerged and hydrostatic pressure when emerged.

4. Tube leakage testing apparatus comprising a container for holding a liquid, vertically movable tube-receiving means in said container for receiving opposite ends of a tube in sealed engagement therewith, said tube-receiving means permitting said tube to be selectively submerged or emerged relative to the liquid in said container, and separate pneumatic and hydrostatic pressure sources, said tube-receiving means at one end of said tube including first passage means leading to both of said pressure sources and first valve means for effecting alternative communication between said tube and said sources, said tube-receiving means at the other end of said tube including second passage means leading to atmosphere and including second valve means for opening and closing said tube to atmosphere.

References Cited in the file of this patent

UNITED STATES PATENTS

| | | |
|---|---|---|
| 1,592,298 | Griffith | July 13, 1926 |
| 2,394,875 | Rommel | Feb. 12, 1946 |
| 2,396,380 | Longley | Mar. 12, 1946 |
| 2,398,328 | Rogers | Apr. 9, 1946 |
| 2,449,556 | Kirkley | Sept. 21, 1948 |
| 2,532,954 | Sherer | Dec. 5, 1950 |
| 2,578,728 | Musser | Dec. 18, 1951 |
| 2,633,739 | Potts | Apr. 7, 1953 |
| 2,673,462 | Thompson | Mar. 30, 1954 |
| 2,697,935 | Gordon | Dec. 28, 1954 |
| 2,766,613 | Williams | Oct. 16, 1956 |

OTHER REFERENCES

Electronics, vol. 23, No. 9, September 1950, pp. 96 to 101.